(12) United States Patent
Zhang et al.

(10) Patent No.: US 10,275,555 B1
(45) Date of Patent: Apr. 30, 2019

(54) YIELD ESTIMATION FOR A POST-LAYOUT CIRCUIT DESIGN

(71) Applicant: Cadence Design Systems, Inc., San Jose, CA (US)

(72) Inventors: Wangyang Zhang, Allison Park, PA (US); Shikha Sharma, Haridwar (IN); Hongzhou Liu, Sewickley, PA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/280,839

(22) Filed: Sep. 29, 2016

(51) Int. Cl.
*G06F 9/455* (2018.01)
*G06F 17/50* (2006.01)

(52) U.S. Cl.
CPC ........ *G06F 17/5036* (2013.01); *G06F 17/504* (2013.01); *G06F 17/5081* (2013.01)

(58) Field of Classification Search
USPC .................................. 716/106, 108, 111, 113
See application file for complete search history.

(56) References Cited

U.S. PATENT DOCUMENTS

| | | | | |
|---|---|---|---|---|
| 8,180,228 B1* | 5/2012 | Harley | ................. | H04B 10/697 398/208 |
| 2001/0010092 A1* | 7/2001 | Kato | .......................... | G06F 1/10 716/113 |
| 2008/0015793 A1* | 1/2008 | Ben-Menahem | ...... | G01N 31/00 702/30 |
| 2008/0026493 A1* | 1/2008 | Shakouri | ................ | G06Q 10/04 438/17 |
| 2010/0329320 A1* | 12/2010 | Umehara | ................. | G06N 7/02 375/227 |
| 2014/0173540 A1* | 6/2014 | Liu | ...................... | G06F 17/5045 716/106 |
| 2015/0322507 A1* | 11/2015 | Zimmermann | ...... | C12Q 1/6811 506/2 |

* cited by examiner

*Primary Examiner* — Brian Ngo
(74) *Attorney, Agent, or Firm* — McDermott Will & Emery LLP

(57) ABSTRACT

Method for estimating a yield of a post-layout circuit design is provided. In one aspect, a method includes obtaining a first pre-layout parameter and a second pre-layout parameter from pre-layout simulation samples of a circuit. The method also modeling a prior distribution of a first post-layout parameter and a second post-layout parameter based on the first pre-layout parameter, the second pre-layout parameter, a first hyper-parameter, and second hyper-parameter. The method further includes calculating the first hyper-parameter and the second hyper-parameter using a cross-validation, obtaining the first post-layout parameter and the second post-layout parameter based on the first hyper-parameter and the second hyper-parameter and estimating the yield of the circuit design using a non-normal distribution parameterized by the obtained first post-layout parameter and second post-layout parameter.

20 Claims, 6 Drawing Sheets

| | $p_{21}$ | $p_{22}$ | $p_{23}$ | $p_{24}$ | $p_{25}$ |
|---|---|---|---|---|---|
| $p_{11}$ | $e_{i11}$ | $e_{i12}$ | $e_{i13}$ | $e_{i14}$ | $e_{i15}$ |
| $p_{12}$ | $e_{i21}$ | $e_{i22}$ | $e_{i23}$ | $e_{i24}$ | $e_{i25}$ |
| $p_{13}$ | $e_{i31}$ | $e_{i32}$ | $e_{i33}$ | $e_{i34}$ | $e_{i35}$ |
| $p_{14}$ | $e_{i41}$ | $e_{i42}$ | $e_{i43}$ | $e_{i44}$ | $e_{i45}$ |
| $p_{15}$ | $e_{i51}$ | $e_{i52}$ | $e_{i53}$ | $e_{i54}$ | $e_{i55}$ |

YIELD ESTIMATION FOR A POST-LAYOUT CIRCUIT DESIGN

TECHNICAL FIELD

The present disclosure generally relates to yield estimation of a post-layout circuit design, and more specifically relates estimating a yield of a post-layout circuit design by reusing pre-layout simulation data.

BACKGROUND

In circuit design process, circuits are schematically designed using, for example, electronic design automation (EDA) tools. Before the schematic design is laid out, a pre-layout simulation is performed on the designed circuit. If the designed circuit meets desired circuit performance, the circuit layout is generated. Following the layout process, a post-layout simulation is performed on the designed circuit to verify the circuit performance by taking into account the parasitic resistance and capacitance elements.

The description provided in the background section should not be assumed to be prior art merely because it is mentioned in or associated with the background section. The background section may include information that describes one or more aspects of the subject technology.

SUMMARY

The disclosed method provides for estimating a yield of a post-layout circuit design with a non-normal distribution by modeling pre-layout simulation data and utilizing a cross-validation to obtain hyper-parameters in modeling the pre-layout simulation data.

According to certain aspects of the present disclosure, a computer-implemented method for estimating a yield of a post-layout circuit design is provided. The method includes obtaining a first pre-layout parameter and a second pre-layout parameter from pre-layout simulation samples of a circuit. The method also includes modeling a prior distribution of a first post-layout parameter and a second post-layout parameter based on the first pre-layout parameter, the second pre-layout parameter, a first hyper-parameter, and second hyper-parameter. The method further includes calculating the first hyper-parameter and the second hyper-parameter using a cross-validation, obtaining the first post-layout parameter and the second post-layout parameter based on the first hyper-parameter and the second hyper-parameter, and estimating the yield of the circuit design using a non-normal distribution parameterized by the obtained first post-layout parameter and second post-layout parameter.

According to certain aspects of the present disclosure, a system for estimating a yield of a post-layout circuit design is provided. The system a memory storing computer code and a processor that executes the computer code obtain a first pre-layout parameter and a second pre-layout parameter from pre-layout simulation samples of a circuit and model a prior distribution of a first post-layout parameter and a second post-layout parameter based on the first pre-layout parameter, the second pre-layout parameter, a first hyper-parameter, and second hyper-parameter. The system also includes the computer code to calculate the first hyper-parameter and the second hyper-parameter using a cross-validation, verify a confidence level of the first pre-layout parameter and the second pre-layout parameter using the first hyper-parameter and the second hyper-parameter, and obtain the first post-layout parameter and the second post-layout parameter based on the first hyper-parameter and the second hyper-parameter. The system further includes code to estimating the yield of the circuit design using a non-normal distribution parameterized by the obtained first post-layout parameter and second post-layout parameter.

According to certain aspects of the present disclosure, a non-transitory computer machine-readable storage medium including machine-readable instructions for causing one or more processor to execute a method for estimating a yield of a post-layout circuit design is provided is provided. The method includes obtaining a first pre-layout parameter and a second pre-layout parameter from pre-layout simulation samples of a circuit. The method also modeling a prior distribution of a first post-layout parameter and a second post-layout parameter based on the first pre-layout parameter, the second pre-layout parameter, a first hyper-parameter, and second hyper-parameter. The method further includes calculating the first hyper-parameter and the second hyper-parameter using a cross-validation, obtaining the first post-layout parameter and the second post-layout parameter based on a maximum-a-posteriori estimation method with the first hyper-parameter and the second hyper-parameter, and estimating the yield of the circuit design using a non-normal distribution parameterized by the obtained first post-layout parameter and second post-layout parameter.

According to certain aspects of the present disclosure, a system for estimating a yield of a post-layout circuit design is provided. The system includes means for obtaining a first pre-layout parameter and a second pre-layout parameter from pre-layout simulation samples of a circuit. The system also includes means for modeling a prior distribution of a first post-layout parameter and a second post-layout parameter based on the first pre-layout parameter, the second pre-layout parameter, a first hyper-parameter, and second hyper-parameter, calculating the first hyper-parameter and the second hyper-parameter using a cross-validation, obtaining the first post-layout parameter and the second post-layout parameter based on the first hyper-parameter and the second hyper-parameter, and estimating the yield of the circuit design using a non-normal distribution parameterized by the obtained first post-layout parameter and second post-layout parameter.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
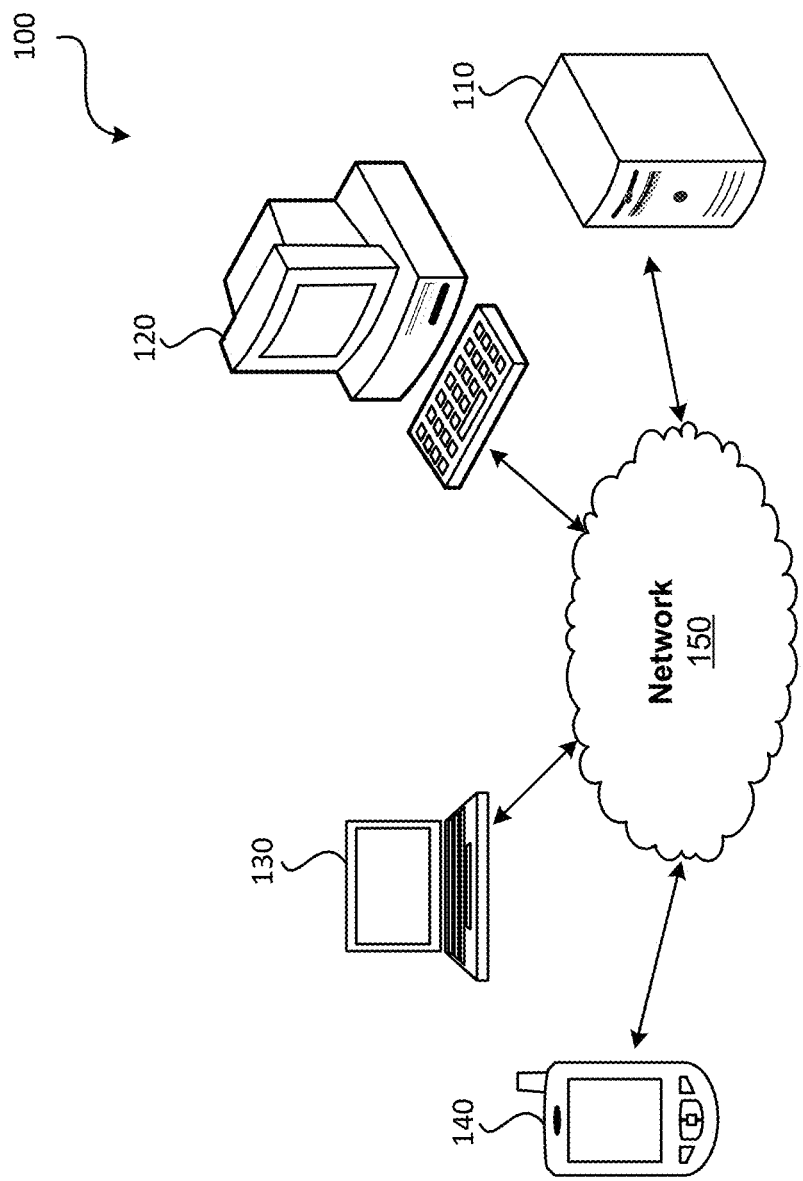
FIG. 1 illustrates an example architecture for estimating a yield of a post-layout circuit design.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for estimating a yield of a post-layout circuit design by reusing pre-layout data.

To ensure that a set of given design specifications of a circuit design are met, a yield of the designed circuit is estimated and compared to a yield target. The yield target may be accompanied by a confidence level in which higher confidence levels denote an increased assurance that a particular outcome is not due to a chance. If the estimated yield meets the yield target with a certain confidence level, the deigned circuit is determined to be reliable and moves to the next process of actual fabrication. Verifying a high yield target with a high confidence level requires a large number of simulation samples of the designed circuit. Table 1 below illustrates example relations between the confidence level and the number of simulation samples required.

TABLE 1

| Confidence Level | Number of Samples |
| --- | --- |
| 80% | 1200 |
| 90% | 1700 |
| 95% | 2200 |

However, verifying a large number of samples for design specification verification is computationally expensive and time-consuming. Therefore, reducing the number of simulation samples while maintaining a yield above a given yield target with a given confident level is desired.

Accordingly, the disclosed system addresses a technical problem tied to circuit design verification in the realm of a circuit design simulation, namely, the technical problem of processing a large number of samples to achieve yield estimation of a post-layout circuit design with a high confidence level. The disclosed system solves this technical problem by using pre-layout data in the post-layout circuit design to reduce the number of samples without compromising the confidence level. The disclosed system can be also applied to find the circuit performance target that corresponds to a pre-defined yield level (e.g. three-sigma). This is a key step in extracting the circuit and performance specific corners used to iteratively tune the circuit design (e.g. a system extracting such corners using yield estimation is described in our previous patent application on k-sigma corners).

Example System Architecture

FIG. 1 illustrates an example architecture 100 for estimating the yield for a post-layout circuit design. The architecture 100 includes a server 110, a computing device (e.g., a workstation) 120, a mobile computer 130, and a mobile device (e.g., a smartphone or PDA) 140. The server 110 can be any device or a web server for hosting an electronic design automation (EDA) application and an electronic (e.g., circuit) design verification service. The workstation 120, the mobile computer 130, and the mobile device 140 each include an EDA client application. The user of the workstation 120, the mobile computer 130, or the mobile device 140 may access the EDA application on the server 110 through the EDA client application on the user's device to design, for example, circuits or integrated circuits. In some aspects, the EDA application and the circuit design verification service reside on the workstation 120, the mobile computer 130, or the mobile device 140. The user may access the EDA application and the logic circuit design verification service on the workstation 120, the mobile computer 130, or the mobile device 140.

The entities of the architecture 100 are connected via a network 150. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, a tree or hierarchical network, and the like.

Figure 2:
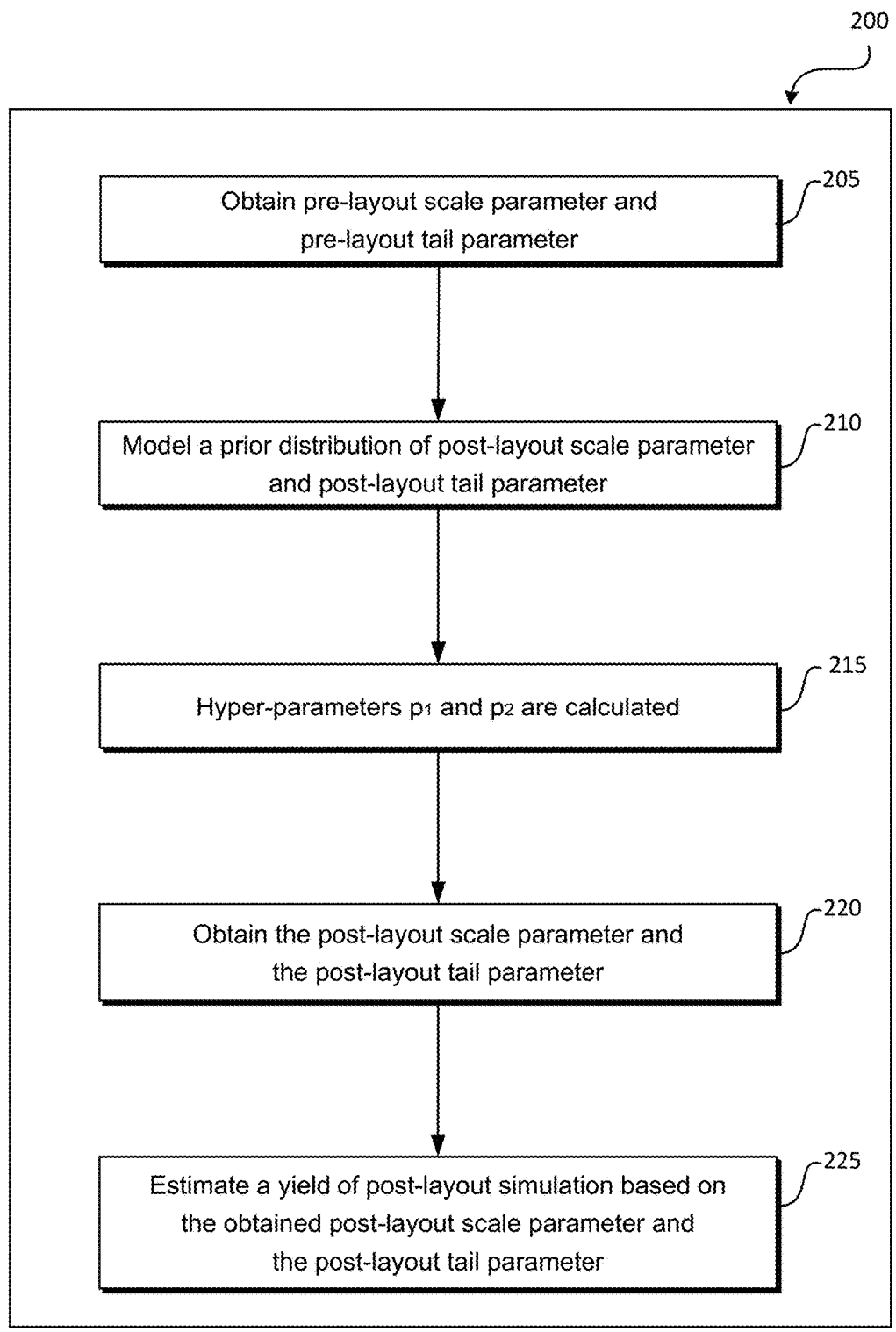
FIG. 2 is a flow diagram illustrating an example yield estimation flow according to certain aspects of the disclosure.

FIG. 2 is a flow diagram illustrating an example yield estimation flow 200 according to certain aspects of the disclosure. In some aspects, the design specifications of the circuit design for which the post-layout circuit design yield estimation is performed are modeled using a non-normal distribution based on a normality test.

A normality test to determine whether each design specification is adequately modeled using a normal distribution or a non-normal distribution may be performed based on the performance model. If the normality test indicates that a normal (e.g., Gaussian type) distribution is applicable for the given design specifications, a normal distribution may be fit to each of the design specifications. On the other hand, if the normality test indicates that a normal distribution is inadequate (e.g., non-normal distribution), an extended normal distribution may be fit to the given design specifications instead.

Figure 3A:
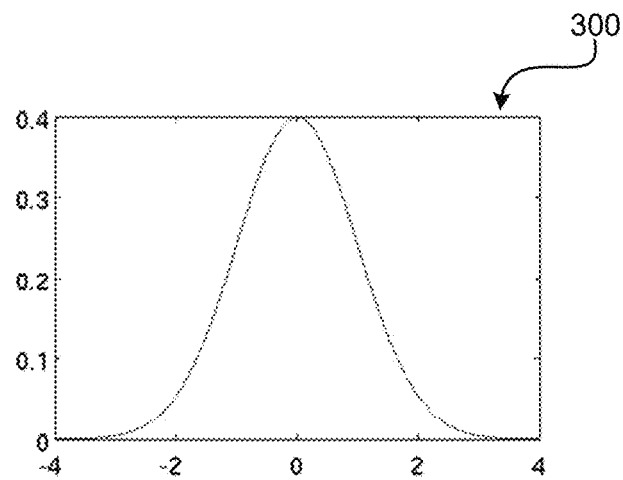
FIGS. 3A-3C illustrate various example distributions used for modeling according to certain aspects of the disclosure.
Figure 3B:
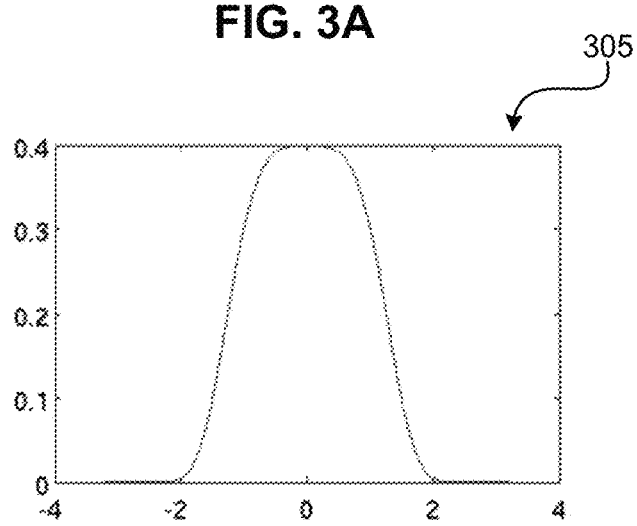
Figure 3C:
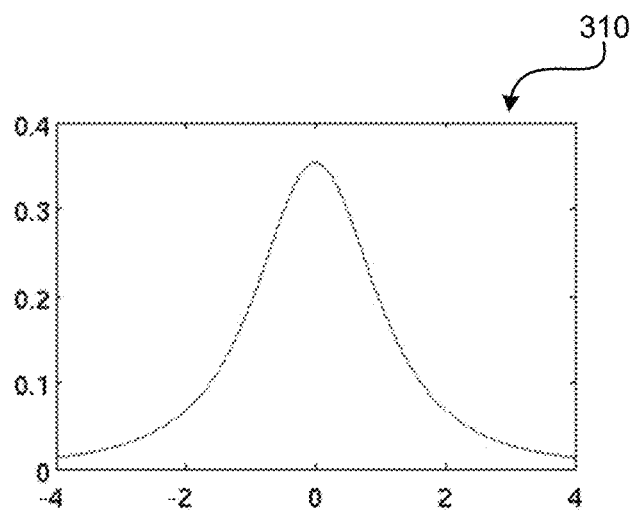

A normal distribution and a non-normal distribution are described in reference to FIGS. 3A-3C. FIGS. 3A-3C illustrate example graphs 300, 305, and 310 of various distributions used for modeling according to certain aspects of the disclosure. FIG. 3A illustrates a graph 300 of a normal distribution. FIG. 3B illustrates a graph 305 of a non-normal distribution having shorter tails and a broader peak than a normal distribution. FIG. 3C illustrates a graph 310 of a non-normal distribution having longer tails and a lower and narrower peak than a normal distribution.

For a normal distribution (e.g., FIG. 3A), mean ($\mu$) and standard deviation ($\sigma$ or sigma) are estimated. However, for a non-normal distribution (e.g., FIGS. 3B and/or 3C), an extended normal distribution described by three parameters termed $x_0$, $x_{ref}$, and $v$ may be fit to the distribution. The parameters $x_0$ and $x_{ref}$ are location and scale parameters, similar to the values of $\mu$ and $\sigma$ in a normal distribution, respectively. The $v$ parameter is a tail parameter with a value range from $-1$ to $1$, inclusive. Distributions with shorter tails than a normal distribution (e.g., FIG. 3B) have $v<0$, while distributions with longer tails than a normal distribution (e.g., FIG. 3C) have $v>0$. For a normal distribution, $x_0 = \mu$ and $x_{ref} = \sigma$ and $v=0$.

Turning back to FIG. 2, at stage 205, a pre-layout scale parameter (e.g., $x_{ref\_pre}$) and a pre-layout tail parameter (e.g., $v_{pre}$) are obtained using the maximum likelihood estimation method which is to be described later.

Figure 4:
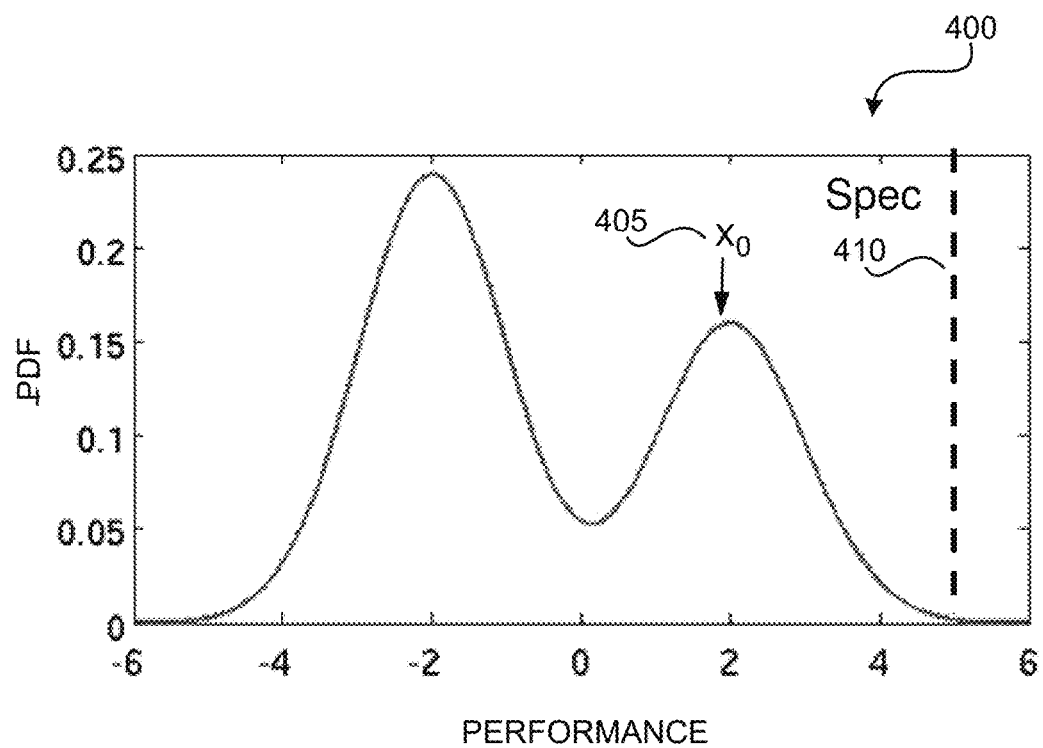
FIG. 4 illustrates an example multimodal distribution according to certain aspects of the disclosure.

FIG. 4 illustrates an example multimodal distribution 400 according to certain aspects of the disclosure. The parameter $x_0$ is estimated using the mode of the distribution instead of the more conventional mean or average value. When there are multiple modes in the distribution, as shown in FIG. 4, the mode (e.g., mode 405) (and the distribution from that point onward to the performance measure specification 410) with the worse or worst performance may be selected for modeling emphasis because the mode 405 has a value closest to the performance measure specification 410. Thus, the mode 405 (and the probability distribution function between mode 405 and the specification 410) is likely to dominate failure boundaries more than other modes. The distribution used for the mode estimation may be fitted using kernel density estimation. In some aspects, the distribution may be defined as long-tailed if kurtosis>3, and short-tailed if kurtosis<3. The pre-layout scale parameter (e.g., $x_{ref\_pre}$) and the pre-layout tail parameter (e.g., $v_{pre}$) are obtained by solving the maximum likelihood estimations described below.

For the short-tailed case (e.g., FIG. 3B), a short-tailed distribution parameterized by $x_0$, $x_{ref}$, and $v$, such as the following exemplary and non-limiting distribution may be estimated:

$$CDF\left(\frac{x-x_0}{x_{ref\_pre}}\right) = NormCDF\left(x + \frac{v_{pre}^2}{6}x^3\right)$$

where NormCDF is the cumulative distribution function (CDF) of the standard normal distribution.

For the long-tailed case (e.g., FIG. 3C), a long-tailed distribution parameterized by $x_0$, $x_{ref\_pre}$, and $v_{pre}$, such as the following exemplary and non-limiting probability density function (PDF) may be estimated:

$$PDF\left(\frac{x-x_0}{x_{ref\_pre}}\right) = t(1/v_{pre})$$

where $t(1/v_{pre})$ is the Student's t-distribution with $1/v_{pre}$ degrees of freedom. In both the long-tailed and the short-tailed cases, maximum likelihood estimation is used to estimate $x_{ref\_pre}$ and $v_{pre}$ from the simulation samples.

The maximum likelihood estimation method performed for the pre-layout simulation is as follows:

$$\max_{x_{ref\_pre}, v_{pre}} \log(PDF(X \mid x_{ref\_pre}, v_{pre})) =$$

$$\max_{x_{ref\_pre}, v_{pre}} \sum_{i=1}^{N} \log(PDF(x_i \mid x_{ref\_pre}, v_{pre}))$$

where N is the number of pre-layout simulation samples, and PDF is the probability density function.

However, for post-layout simulation, the maximum-a-posteriori estimation will be used. The maximum-a-posteriori estimation includes prior distribution, which refers to information that allows the post-layout simulation to be foreseen without observing any post-layout simulation data:

$$\max_{x_{ref}, v} PDF(x_{ref}, v \mid X) = \max_{x_{ref}, v} \frac{PDF(X \mid x_{ref}, v) \cdot PDF(x_{ref}, v)}{PDF(X)}$$

which may be equivalent to:

$$\max_{x_{ref}, v} PDF(X \mid x_{ref}, v) \cdot PDF(x_{ref}, v)$$

Similar to the above-described short-tailed distribution and long-tailed distribution, the likelihood function PDF $(X|x_{ref}, v)$ is defined using a long-tailed or short-tailed distribution parameterized by $x_{ref}$ and $v$. Returning to FIG. 2, after the pre-layout scale parameter (e.g., $x_{ref\_pre}$) and the pre-layout tail parameter (e.g., $v_{pre}$) are obtained, a prior distribution $PDF(x_{ref}, v)$ of a post-layout scale parameter and a post-layout tail parameter is modeled using the pre-layout scale parameter (e.g., $x_{ref\_pre}$) and the pre-layout tail parameter (e.g., $v_{pre}$) at stage 210.

The post-layout scale parameter and the post-layout tail parameter are obtained by using a maximum likelihood estimation of the pre-layout simulation data. Further, the post-layout scale parameter (e.g., $x_{ref}$) and the post-layout tail parameter (e.g., $v$) are modeled as independent variables as shown below:

$$PDF(x_{ref}, v) = PDF(x_{ref}) \cdot PDF(v)$$

The post-layout scale parameter (e.g., $x_{ref}$) and a post-layout tail parameter (e.g., $v$) are further modeled as a normal distribution centered at the respective pre-layout scale parameter (e.g., $x_{ref\_pre}$) and pre-layout tail parameter (e.g., $v_{pre}$):

$$x_{ref} \sim N(x_{ref\_pre}, (p_1 \cdot x_{ref\_pre})^2)$$

$$v \sim N(v_{pre}, (p_2 \cdot v_{pre})^2)$$

where N is the number of simulation samples, and $p_1$ and $p_2$ are hyper-parameters for defining a confidence level of the pre-layout scale parameter (e.g., $x_{ref\_pre}$) and the pre-layout tail parameter (e.g., $v_{pre}$).

At stage 215, the hyper-parameters $p_1$ and $p_2$ are calculated using a two-dimensional cross-validation. The confidence level of the prior knowledge may be controlled by the hyper-parameters $p_1$ and $p_2$. For example, large hyper-parameters $p_1$ and $p_2$ may place a wide distribution on the post-layout scale parameter (e.g., $x_{ref}$) and a post-layout tail parameter (e.g., v). A wide distribution of the post-layout parameters may create a significant difference when compared to the pre-layout scale parameter (e.g., $x_{ref\_pre}$) and the pre-layout tail parameter (e.g., $v_{pre}$). In other words, the post-layout scale parameter (e.g., $x_{ref}$) and a post-layout tail parameter (e.g., v) may have a large variance before any post-layout data is observed. Accordingly, in some aspects, large hyper-parameters $p_1$ and $p_2$ indicate that post-layout data may not be predictable from the prior knowledge of pre-layout data, for example, to the pre-layout scale parameter (e.g., $x_{ref\_pre}$) and the pre-layout tail parameter (e.g., $v_{pre}$), thus, the post-layout scale parameter (e.g., $x_{ref}$) and a post-layout tail parameter (e.g., v) may result in the maximum likelihood of estimation.

On the other hand, small hyper-parameters $p_1$ and $p_2$ may result in the post-layout scale parameter (e.g., $x_{ref}$) and the post-layout tail parameter (e.g., v) being near the pre-layout scale parameter (e.g., $x_{ref\_pre}$) and the pre-layout tail parameter (e.g., $v_{pre}$), respectively. That is, for example, small hyper-parameters $p_1$ and $p_2$ that are relatively close to a zero indicate that the post-layout scale parameter (e.g., $x_{ref}$) and a post-layout tail parameter (e.g., v) will result to the pre-layout data which are the pre-layout scale parameter (e.g., $x_{ref\_pre}$) and the pre-layout tail parameter (e.g., $v_{pre}$), respectively.

Therefore, hyper-parameters $p_1$ and $p_2$ that result to the post-layout scale parameter (e.g., $x_{ref}$) and the post-layout tail parameter (e.g., v) to be between the maximum likelihood of estimation and the pre-layout data are desired. The optimal values of hyper-parameters $p_1$ and $p_2$ may be calculated using the two-dimensional cross-validation which will be explained later.

Moving on to stage 220, after the hyper-parameters $p_1$ and $p_2$ are calculated using the two-dimensional cross-validation, a maximum-a-posteriori estimation in the above-described maximum likelihood estimation method is solved to obtain the post-layout scale parameter (e.g., $x_{ref}$) and the post-layout tail parameter (e.g., v).

At stage 225, a yield of post-layout circuit design is estimated based on the modeled post-layout scale parameter (e.g., $x_{ref}$) and a post-layout tail parameter (e.g., v). By reusing the pre-layout data (e.g., the pre-layout scale parameter (e.g., $x_{ref\_pre}$) and the pre-layout tail parameter (e.g., $v_{pre}$)) as prior distribution, the number so samples required to run a post-layout simulation that satisfies a target yield with a given confidence level may be reduced.

Figures 5A, 5B:
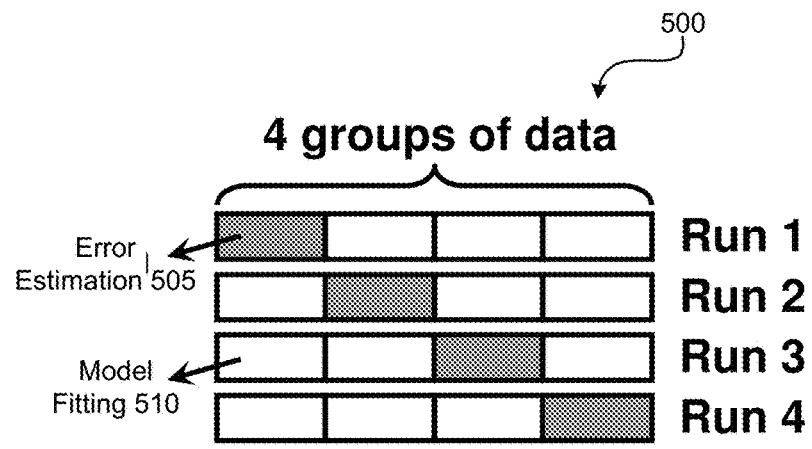
FIG. 5A illustrates an example partitioning of a data set in cross-validation according to certain aspects of the disclosure.
FIG. 5B illustrates an example table for cross-validation according to certain aspects of the disclosure.

Turning to FIGS. 5A and 5B, the two-dimensional cross-validation will be described in reference to FIGS. 5A and 5B. The two-dimensional cross-validation determines optimal values for of hyper-parameters $p_1$ and $p_2$. In some aspects, as mentioned above, the hyper-parameters $p_1$ and $p_2$ are used to control the pre-layout data to predict the post-layout circuit design with optimal accuracy.

In the two-dimensional cross-validation, the whole data set of the post-layout simulation is partitioned into F random folds. The number of random folds may be 5 or 10. The number of random folds also refers to the number of times a yield estimation model fitting is performed. Further, each time F−1 folds is used to fit the model to run the entire outcome, the other fold left to verify the error of the outcome, thus, the parameters may be adjusted to produce the smallest error. The error can be estimated from the error estimation fold.

FIG. 5A illustrates an example partitioning 500 of data set in cross-validation according to certain aspects of the disclosure. The partitioning 500 illustrates a data set partitioned into four random folds. Therefore, the yield estimation is performed four times. Error estimation 505 is represented by a grey box in each of the four runs. Model fitting 510 is represented by white boxes in each of the four runs.

The error estimation with a number of various hyper-parameters $p_1$ and $p_2$ combinations may be executed for each of the folds in the two-dimensional cross-validation. FIG. 5B illustrates an example table 520 for cross-validation according to certain aspects of the disclosure. The two-dimensional table 520 includes possible hyper-parameters $p_1$ and $p_2$ combinations, wherein the error estimation is executed for each of the hyper-parameters $p_1$ and $p_2$ combinations.

For example, for each fold i, the error estimation is performed for each of the hyper-parameters $p_1$ and $p_2$ combinations. The total error is calculated across the entire folds by:

$$e_{jk} = \sum_i e_{ijk}$$

where i indicates the subject fold, j indicates the hyper-parameter $p_1$ value, and k indicates the hyper-parameter $p_2$ value.

Based on the total error, the hyper-parameters $p_1$ and $p_2$ combination which minimizes the error function, $e_{jk}$, may be selected as the optimal hyper-parameters $p_1$ and $p_2$ combination.

In some aspects, the error function is defined using the yield estimation difference using a model compared to a golden reference using entire post-layout simulation samples. Prior to performing the two-dimensional cross-validation, the post-layout simulation samples are sorted. The yield estimation for each of the post-layout simulation samples may be calculated by:

$$y_{golden,n}(n-0.5)/N$$

where n indicates an index of the post-layout simulation samples in the sorted sequence, and N is the total number of the post-layout simulation samples.

For each two-dimensional cross-validation fold i, a yield of a test sample l for the hyper-parameters $p_1$ and $p_2$ combination selection (j, k) is calculated by:

$$y_{ijkl} = \begin{cases} 2 \cdot (1-c_i) \cdot CDF_{ijk}(x_{il}) + 2c_i - 1 & x_{il} \geq x_{0i} \\ \text{Percentile of } x_{il} \text{ within training samples } i & x_{il} < x_{0i} \end{cases}$$

where $CDF_{ijk}$ indicates the distribution model fit by fold i using the hyper-parameters $p_1$ and $p_2$ combination selection (j, k). $x_{0i}$ is the $x_0$ estimation for fold i, $c_i$ is the percentile of $x_{0i}$ within training samples for fold i and $x_{il}$ is the value of the test sample l.

The error for the test sample l is then defined as:

$$e_{ijkl} = y_{ijkl} - y_{golden,ijkl}$$

where $y_{golden,ijkl}$ is the corresponding golden yield estimation of the test sample l.

In some aspects, when computing the total error for each fold i, any error estimations for all of the post-layout simulation samples that are less than $x_{0i}$ are discarded since the yield accuracy of tail samples are required. Therefore, the overall error function for fold i is defined as:

$$e_{ijkl} = \sum_{x_{il} \geq x_{0i}} e_{ijkl}^2$$

Hardware Overview

Figure 6:
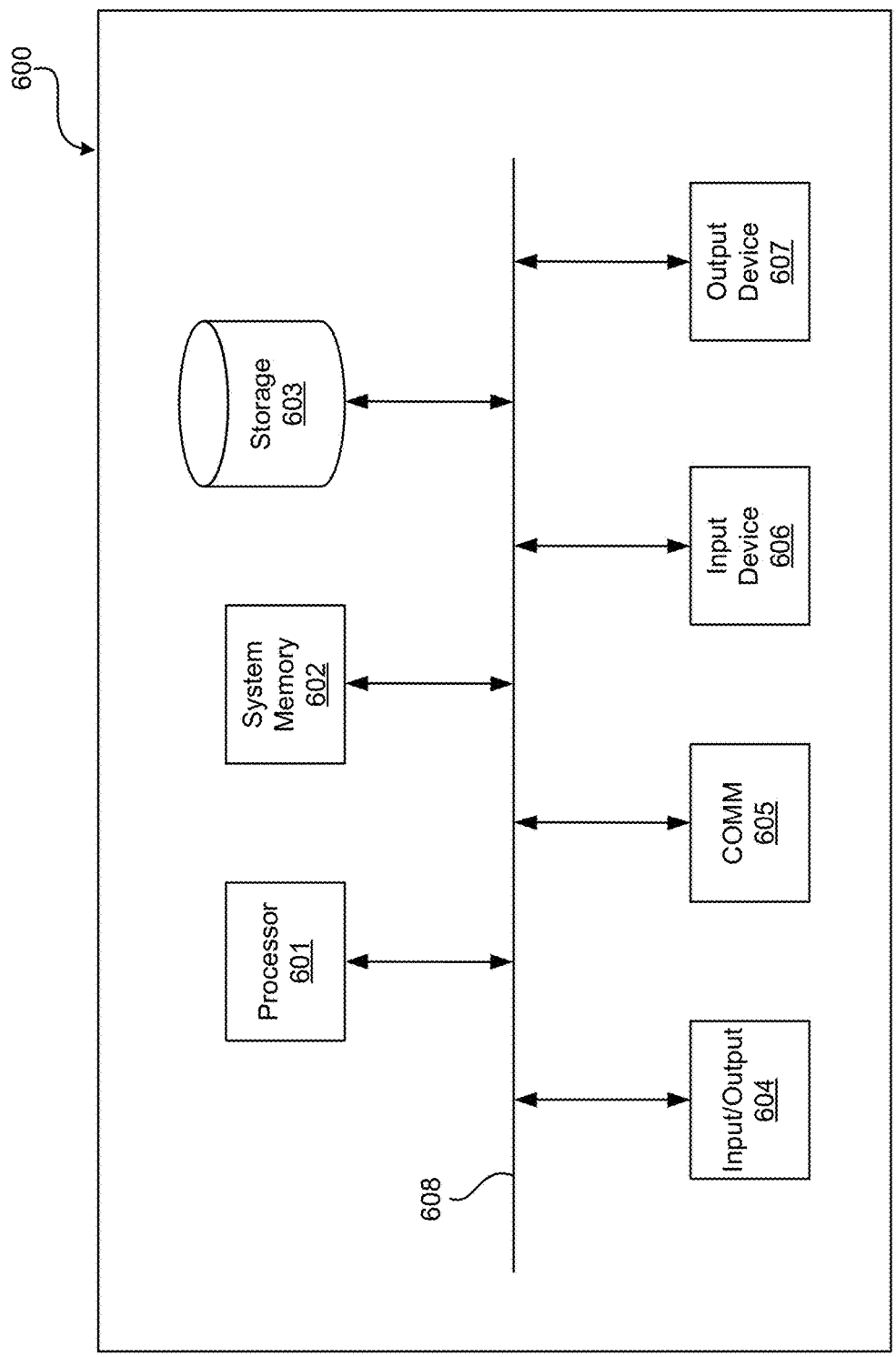
FIG. 6 is a block diagram illustrating an example computer system with which the estimating a yield of a circuit design simulation.

FIG. 6 is a block diagram illustrating an example computer system 600 with which estimating a yield of a circuit design simulation can be implemented. In some aspects, the computer system 600 may represent the server 110, the computing device 120, the mobile computer 130, and the mobile device 140 of FIG. 1. In certain aspects, the computer system 600 may be implemented using hardware or a combination of software and hardware, either in a dedicated server, or integrated into another entity, or distributed across multiple entities.

Computer system 600 (e.g., server 110, workstation 120, the mobile computer 130, the mobile device 140) includes a bus 608 or other communication mechanism for communicating information, and a processor 601 coupled with bus 608 for processing information. According to one aspect, the computer system 600 can be a cloud computing server of an IaaS that is able to support PaaS and SaaS services.

Computer system 600 can include, in addition to hardware, code that creates an execution environment for the computer program in question, e.g., code that constitutes processor firmware, a protocol stack, a database management system, an operating system, or a combination of one or more of them stored in an included memory 602, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 601. The processor 601 and the memory 602 can be supplemented by, or incorporated in, special purpose logic circuitry.

The instructions may be stored in the memory 602 and implemented in one or more computer program products, e.g., one or more modules of computer program instructions encoded on a computer readable medium for execution by, or to control the operation of, the computer system 600.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 603 such as a magnetic disk or optical disk, coupled to bus 608 for storing information and instructions. Computer system 600 may be coupled via input/output module 604 to various devices. The input/output module 604 can be any input/output module. Example input/output modules 604 include data ports such as USB ports. In addition, input/output module 604 may be provided in communication with processor 601, so as to enable near area communication of computer system 600 with other devices. The input/output module 604 may provide, for example, for wired communication in some implementations, or for wireless communication in other implementations, and multiple interfaces may also be used. The input/output module 604 is configured to connect to a communications module 605. Example communications modules 605 may include networking interface cards, such as Ethernet cards and modems.

In certain aspects, the input/output module 604 is configured to connect to a plurality of devices, such as an input device 606 and/or an output device 607. Example input devices 606 include a keyboard and a pointing device, e.g., a mouse or a trackball, by which a user can provide input to the computer system 600. Other kinds of input devices 606 can be used to provide for interaction with a user as well, such as a tactile input device, visual input device, audio input device, or brain-computer interface device.

According to one aspect of the present disclosure, the server 110, the work station 120, mobile computer 130, and mobile device 140 can be implemented using a computer system 600 in response to processor 601 executing one or more sequences of one or more instructions contained in memory 602. Such instructions may be read into memory 602 from another machine-readable medium, such as data storage device 603. Execution of the sequences of instructions contained in main memory 602 causes processor 601 to perform the process steps described herein. One or more processors in a multi-processing arrangement may also be employed to execute the sequences of instructions contained in memory 602. Processor 601 may process the executable instructions and/or data structures by remotely accessing the computer program product, for example by downloading the executable instructions and/or data structures from a remote server through communications module 605 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 601 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for estimating a yield of a post-layout circuit design, the method comprising:
obtaining, by a processor, a first pre-layout parameter and a second pre-layout parameter from multiple pre-layout simulation samples of a circuit, wherein at least one of the first pre-layout parameter and the second pre-layout parameter comprises a tail parameter indicative of a probability that the post-layout circuit design fails a specification target;
generating, by the processor, a number of combinations of a first hyper-parameter and a second hyper-parameter using a cross-validation;
selecting, by the processor, a first combination of the first hyper-parameter and the second hyper-parameter from the number of combinations of the first hyper-parameter and the second hyper-parameter;
modeling, by the processor, a prior distribution of a first post-layout parameter and a second post-layout parameter based on the first pre-layout parameter, the second pre-layout parameter, and the first combination of the first hyper-parameter and the second hyper-parameter;
obtaining, by the processor, the first post-layout parameter and the second post-layout parameter based on the first combination of the first hyper-parameter and the second hyper-parameter;
estimating, by the processor, the yield of the post-layout circuit design using a non-normal distribution parameterized by the first post-layout parameter and second post-layout parameter; and
when the yield of the post-layout circuit design falls short of a pre-selected threshold, transforming a layout of the post-layout circuit design to obtain a modified first hyper-parameter and a modified second hyper-parameter associated with a higher yield of the post-layout circuit design.

2. The method according to claim 1, wherein the first pre-layout parameter and the second pre-layout parameter are obtained using a maximum likelihood estimation method from the pre-layout simulation samples of the circuit.

3. The method according to claim 1, further comprising verifying a confidence level of the first pre-layout parameter and the second pre-layout parameter using the first hyper-parameter and the second hyper-parameter.

4. The method according to claim 3, further comprising determining an error function for optimizing a yield estimation.

5. The method according to claim 4, wherein determining the error function further comprises calculating a second yield estimation for each of multiple post-layout samples before the cross-validation is applied.

6. The method according to claim 5, wherein determining the error function further comprises comparing a first yield estimation with a second yield estimation.

7. The method according to claim 1, wherein modeling the prior distribution further comprises modeling the first post-layout parameter and the second post-layout parameter as a normal distribution centered at the first pre-layout parameter and the second pre-layout parameter, respectively.

8. The method according to claim 1, wherein the first post-layout parameter and the second post-layout parameter are obtained based on a maximum-a-posteriori estimation method.

9. A system for estimating a yield of a post-layout circuit design, the system comprising:
a memory, storing a computer code; and
a processor configured to execute the computer code to:
obtain a first pre-layout parameter and a second pre-layout parameter from pre-layout simulation samples of a circuit, wherein at least one of the first pre-layout parameter and the second pre-layout parameter comprises a tail parameter indicative of a probability that the post-layout circuit design fails a specification target;
generate a number of combinations of a first hyper-parameter and a second hyper-parameter using a cross-validation;
select a first combination of the first hyper-parameter and the second hyper-parameter from the number of combinations of the first hyper-parameter and the second hyper-parameter;
model a prior distribution of a first post-layout parameter and a second post-layout parameter based on the first pre-layout parameter, the second pre-layout parameter and the first combination of the first hyper-parameter and the second hyper-parameter;
verify a confidence level of the first pre-layout parameter and the second pre-layout parameter using the first hyper-parameter and the second hyper-parameter;
obtain the first post-layout parameter and the second post-layout parameter based on the first hyper-parameter and the second hyper-parameter;
estimate the yield of the post-layout circuit design using a non-normal distribution parameterized by the first post-layout parameter and second post-layout parameter; and
when the yield of the post-layout circuit design falls short of a pre-selected threshold, transform a layout of the post-layout circuit design to obtain a modified first hyper-parameter and a modified second hyper-parameter associated with a higher yield of the post-layout circuit design.

10. The system according to claim 9, further comprising obtaining the first pre-layout parameter and the second pre-layout parameter with a maximum likelihood estimation method from the pre-layout simulation samples of the circuit.

11. The system according to claim 9, further comprising determining an error function for optimizing a yield estimation.

12. The system according to claim 11, wherein determining the error function further comprises calculating a second yield estimation for each of multiple post-layout samples before the cross-validation is applied.

13. The system according to claim 12, wherein determining the error function further comprises comparing a first yield estimation with a second yield estimation.

14. The system according to claim 9, wherein modeling the prior distribution further comprises modeling the first post-layout parameter and the second post-layout parameter as a normal distribution centered at the first pre-layout parameter and the second pre-layout parameter, respectively.

15. The system according to claim 9, wherein the first post-layout parameter and the second post-layout parameter are obtained based on a maximum-a-posteriori estimation method.

16. A non-transitory, machine-readable storage medium comprising machine-readable instructions for causing a processor to execute a method for estimating a yield of a post-layout circuit design, the method comprising:
obtaining a first pre-layout parameter and a second pre-layout parameter from pre-layout simulation samples of a circuit, wherein at least one of the first pre-layout parameter and the second pre-layout parameter comprises a tail parameter indicative of a probability that the post-layout circuit design fails a specification target;

generating a number of combinations of a first hyper-parameter and a second hyper-parameter using a cross-validation;

selecting a first combination of the first hyper-parameter and the second hyper-parameter from the number of combinations of the first hyper-parameter and the second hyper-parameter;

modeling a prior distribution of a first post-layout parameter and a second post-layout parameter based on the first pre-layout parameter, the second pre-layout parameter, and the first combination of the first hyper-parameter and the second hyper-parameter;

obtaining the first post-layout parameter and the second post-layout parameter based on a maximum-a-posteriori estimation method with the first combination of the first hyper-parameter and the second hyper-parameter;

estimating the yield of the post-layout circuit design using a non-normal distribution parameterized by the first post-layout parameter and second post-layout parameter; and when the yield of the post-layout circuit design falls short of a pre-selected threshold, transforming a layout of the post-layout circuit design to obtain a modified first hyper-parameter and a modified second hyper-parameter associated with a higher yield of the post-layout circuit design.

17. The non-transitory, machine-readable medium of claim 16, wherein the first pre-layout parameter and the second pre-layout parameter are obtained using a maximum likelihood estimation method from the pre-layout simulation samples of the circuit.

18. The non-transitory, machine-readable medium of claim 16, wherein the method further comprises determining an error function for optimizing a yield estimation.

19. The non-transitory, machine-readable medium of claim 18, wherein, in the method:

determining the error function further comprises calculating a second yield estimation for each of multiple post-layout samples before the cross-validation is applied, and determining the error function further comprises comparing a first yield estimation with a second yield estimation.

20. The non-transitory, machine-readable medium of claim 16, wherein, in the method, modeling the prior distribution further comprises modeling the first post-layout parameter and the second post-layout parameter as a normal distribution centered at the first pre-layout parameter and the second pre-layout parameter, respectively.

* * * * *